United States Patent [19]
Koch et al.

[11] 3,875,108
[45] Apr. 1, 1975

[54] DEEP DYEABLE, LUSTEROUS, AND FIRE-RETARDANT LINEAR POLYESTER COMPOSITION

[75] Inventors: Paul J. Koch, Mt. Freedom; Eli M. Pearce, Somerville; Julie A. Lapham, Denville, all of N.J.

[73] Assignee: Allied Chemical Corporation, New York, N.Y.

[22] Filed: Nov. 24, 1972

[21] Appl. No.: 309,390

Related U.S. Application Data

[63] Continuation of Ser. No. 99,701, Dec. 18, 1970, abandoned.

[52] U.S. Cl............ 260/45.7 P, 161/67, 161/403, 260/45.7 R, 260/75 H, 260/75 P
[51] Int. Cl............................................. C09k 3/28
[58] Field of Search......... 260/45.7 P, 45.7 R, 75 P; 161/403

[56] References Cited
UNITED STATES PATENTS

| | | | |
|---|---|---|---|
| 3,347,822 | 10/1967 | Jenkner | 260/45.75 |
| 3,535,300 | 10/1970 | Gable | 260/29.1 |
| 3,576,780 | 4/1971 | Jackson, Jr. | 260/30.6 |
| 3,629,365 | 12/1971 | Gardner | 260/857 |
| 3,639,506 | 2/1972 | Haaf | 260/874 |
| 3,658,634 | 4/1972 | Yanagi et al. | 161/175 |
| 3,688,001 | 8/1972 | Exner et al. | 260/463 |

OTHER PUBLICATIONS

Hilado, "Flammability Handbook for Plastics," 1969, pages 85 and 86.

*Primary Examiner*—Donald E. Czaja
*Assistant Examiner*—R. A. White
*Attorney, Agent, or Firm*—Roger H. Criss; Arthur J. Plantamura

[57] ABSTRACT

Linear condensation polyesters in the form of fibers, and other shaped articles of commerce, are made fire-retardant while retaining their luster and deep dyeability by having a finely divided solid aryl bromine fire retardant in combination with an aryl phosphate dispersed therein. The amount of said fire-retardant additives are about 1 to 22 percent by weight, which is sufficient to render fabrics of the fiber fire retardant.

8 Claims, No Drawings

DEEP DYEABLE, LUSTEROUS, AND FIRE-RETARDANT LINEAR POLYESTER COMPOSITION

This is a continuation of application Ser. No. 99,701, filed Dec. 18, 1970, now abandoned.

BACKGROUND OF THE INVENTION

This invention relates to an improved product and process for preparing linear condensation polyesters. More particularly, it relates to fire-retardant, lusterous and deep dyeable polyester compositions and process for preparing same.

Linear condensation polyester is prepared by a two-stage process, namely, the first stage of preparing monomeric bis-glycol ester of polycarboxylic acid or its oligomer, and the second stage of subjecting the product to further polycondensation. Linear polyethylene terephthalate is presently produced on a commercial scale by either the ester interchange reaction between dimethyl terephthalate and ethylene glycol or by the direct esterification method wherein the acid and polyol can be reacted directly.

Synthetic polymers in the form of fibers, filaments, films and other shaped articles such as knitted and woven fabrics are extensively used as articles of commerce. For many end-uses it is important, and in some cases mandatory, that fabrics, e.g., clothing, drapes, carpets, etc., be flame resistant and self-extinguishing when exposed to flame. Various fire retardants have been used in the past with some degree of success. However, many fire-retardant materials suffer from the disadvantage that they often produce undesirable side effects such as improper coloration, loss of luster of the fabric and loss of the fire-retardant material through normal laundering methods, for example. Also, to obtain sufficient fire resistance of the fabric, an exorbitant amount of fire-retardant material is often needed, which adversely affects the required physical properties of the fabric, dye fading, and an undesirable hand is imparted to the fabric as well as adverse soiling tendencies. Also, most fire-retardant additives are not stable to the melt-spinning process. There are many different types of synthetic fibers and each generally requires special attention to make it sufficiently fire retardant.

SUMMARY OF THE INVENTION

The present invention provides a fire-retardant, lusterous and deep dyeable polyester composition and process for preparing said composition. Such compositions and products made therefrom are useful in various fiber applications.

A prime object of this invention is to provide polyester fibers from which fabrics, draperies, carpets, etc., can be made which posssess excellent fire-retardance, luster, and deep-dye characteristics and which generally comply with safety and commercial requirements with respect to performance characteristics and appearance.

Another object of this invention is to provide polyester fibers having fire-retardant additives dispersed therein in relatively small, effective amounts to render fabrics and other articles manufactured from such fibers self-extinguishing without having any undesirable side effects.

Another and more specific object of this invention is to provide an additive for the polyester yarn-forming composition comprising a combination of an bromoaryl compound and an aryl phosphate which imparts to said polyester satisfactory fire-retardancy, luster and deep dyeability.

Other objects will become apparent in the course of the following description.

In accordance with the foregoing objects, we have discovered that a lusterous and deep-dyeable polyester composition having excellent fire retardancy can be made by incorporating into the polyester minor amounts of a solid bromoaryl compound, together with minor amounts of an aryl phosphate. Because of the general tendency of the polyester to lose luster and color stability when fire-retardant additives are introduced, the selectivity and amount of these compounds in combination is important.

The aryl brominated compounds employed in the present invention are those having at least five bromine substituents and are selected from the group consisting of compounds of the formula:

(I) 

(II) 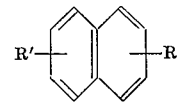

(III) 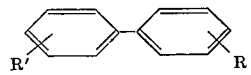

wherein R and R' are substituents selected from the group consisting of methyl, ethyl, hydrogen, chlorine, and bromine. Suitable illustrative compounds represented by formula (I) are pentabromobenzene, hexabromobenzene, pentabromotoluene, chloropentabromobenzene, and the like. Suitable illustrative examples of compounds represented by formula (II) are pentabromonaphthalene, octabromonaphthalene, dimethylpentabromonaphthalene, dichlorohexabromonaphthalene, chloromethylethylpentabromonaphthalene, and the like. Illustrative examples of compounds represented by formula (III) are pentabromodiphenyl, decabromodiphenyl, pentamethylpentabromodiphenyl, dichlorotriethylpentabromodiphenyl, chloromethyloctabromodiphenyl, and the like.

Aryl phosphates contemplated by the invention are those having the formula

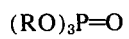

wherein R is a substituent selected from the group consisting of phenyl, naphthyl and diphenyl, and alkyl and halogen-subsituted phenyl, naphthyl and diphenyl substituents. Illustrative examples of phosphates of this formula include substituted phenyl, naphthyl or diphenyl groups with the substituents being alkyl groups or halogen atoms; tricresylphosphate, tris(tribromophenyl) phosphate, tris(dimethylnaphthyl)phosphate, tris(chlorodiethyldiphenyl) phosphate, and the like.

The amount of such bromoaryl compounds employed, based on the total weight of the resin, is such that it yields from about one to about 10% bromine and preferably 2% to 4%. The amount of aryl phosphate is such that it yields from about 0.1% to about 2%, phosphorus, preferably 0.2% to about 1%.

We have discovered that the coexistence of these fire retardants is important in retaining the desirable properties of the polyester. In other words, while the increase of either the bromoaryl compound or the phosphate compound individually in amounts exceeding those stated above may be used with consequential increase in fire-retardant properties, such increase tends to adversely affect the resin in other respects, e.g., the luster suffers and the color properties deteriorate. However, when bromoaryl compound and aryl phosphate are employed together in combination, even when the total amount of both exceeds that amount which individually could be tolerated by the resin without adverse effects, no loss of luster and color retention properties is detected.

The polyester composition containing the combination fire-retardant combination of the present invention is substantially insensitive to moisture and, when ignited, is self-extinguishing.

The polyester component of the compositions of this invention is normally solid fiber-forming linear polyesters and can be made by procedures which are conventionally employed for making polyesters of this kind. The dicarboxylic acid may be terephthalic acid, and the glycol may be ethylene glycol, but copolymer modifications, as well as fiber-forming polyesters such as those based on hydroxyethylbenzoic acid and cyclohexane dimethanol and terephthalic acid may be utilized. Polyesters of this type with which the invention are concerned are described in greater detail in the literature. See, for example, Sorenson, W. R. and T. W. Campbell, "Preparative Methods of Polymer Chemistry," 2nd Ed., Interscience Publishers (New York) 1968.

A suitable test which may be utilized to illustrate fire-retardancy is the oxygen index test—a test is described in the ASTM Standard for the Oxygen Index Test D-2862. This method describes a procedure for determining the relative flammability of plastics by measuring the minimum concentration of oxygen in a mixture of oxygen and nitrogen that will just support combustion. Another test for flammability in U.S. Department of Commerce flammability standard for carpets and rugs titled DOC FF-1-70. This method describes a procedure for determining the relative flammability of carpets and rugs by measuring the flame spread and charred portion of 9 inch by 9 inch specimens held in a flattening frame (8 inches diameter) which have been ignited at the center by a timed burning methenamine tablet.

The following examples illustrate the principles of this invention, but it should be understood that these examples are given by way of illustration and not of limitation and that many changes in the details can be made without departing from the spirit of the invention.

EXAMPLE 1 (Comparative)

Four hundred grams of 100% polyethylene terephthalate was extruded at 280°C through a spinnerette with an 0.030 inch opening using a ¾ inch Brabender extruder. At the extrusion rate of 20 grams per minute, the extruder was purged for 10 minutes and the remainder of the polymer collected in preheated (~100°C) brass bar molds. The bars obtained were ½ inch wide by 5½ inches long and ¼ inch thick. When solidified, the bars were shaken from the molds. The Oxygen Index was then determined on the specimens by the technique outlined in ASTM Standard for the Oxygen Index Test D-2863. The Oxygen Index was found to be 0.269. When ignited by a bunsen burner flame, these specimens continued burning in air even after the bunsen burner flame was removed.

EXAMPLE 2

Ground polyester (367 parts) is mixed with 22.5 parts of hexabromobenzene and 10.5 parts of triphenyl phosphate to give a blend containing 5% bromine and 0.25% phosphorous. Specimens were prepared as described in Example 1. The Oxygen Index was found to be 0.333. No loss of luster or adverse effect on color quality is detected. When ignited by a bunsen burner flame, these specimens stopped burning in air after the bunsen burner flame was removed.

The following examples were made by the same techniques and tested under the same conditions as described in the previous examples.

FURTHER EXAMPLES

| Ex. No. | Br (%) | P (%) | Additive to Yield Br or P | Oxygen Index | Luster | Color Quality |
|---|---|---|---|---|---|---|
| 1 | 0 | 0 | None | 0.269 | Good | Good |
| 3 | 10 | 0 | Hexabromobenzene | 0.339 | Poor | Poor |
| 4 | 0 | 4.5 | Tricresyl phosphate | 0.309 | Poor | Poor |
| 5 | 2 | 0.25 | Hexabromobenzene plus triphenyl phosphate | 0.328 | Good | Good |
| 6 | 3 | 0.5 | Pentabromotoluene plus triphenyl phosphate | 0.333 | Good | Good |
| 7 | 3 | 0.5 | Octabromodiphenyl plus triphenyl phosphate | 0.327 | Good | Good |

EXAMPLE 8

170 Parts of hexabromobenzene, 265 parts of triphenyl phosphate and 5000 parts of polyethylene terephthalate pellets were mixed and then dried in a vacuum oven for 16 hours at 95°C. This was then spun into 210 denier, 14 filament at 280°C. The yarn was plied together to form a 2100 denier yarn containing 140 filaments. The yarn was then texturized with a steam-jet texturizer.

The yarn and a control yarn of 100% polyester were tufted into cut pile carpets which are a cross between the constructions known in the trade as shag and plush. The pile height was 1½ inches, and the yarn densities were about 28 oz./yd$^2$. The fibers with additives were as lusterous as those of the standard. The carpets were mock-dyed using standard polyester carpet-dyeing procedures and latexed with a light even application. The fibers with additives were as deep dyeable as those of the standard.

These carpet samples were tested for flammability using the DOC FF 1-70 test method. All eight of the carpet specimens containing hexabromobenzene and triphenyl phosphate passed the test. Six of the eight control samples failed the test.

EXAMPLE 9

210 Denier, 14 filament yarn prepared as in Example 8 and a control yarn of 100% polyester are separately knit into sleeves on a circular knitting machine. The Oxygen Index is then determined on 2 inches × 10 inches fabric specimens cut from the sleeves and held vertically in the Oxygen Index tester by a U-frame holder. Ignition is from the top. The Oxygen Index for the control yarn of 100% polyester is 0.208 versus 0.280 for the aryl bromine and phosphate-treated fabric. (The lower oxygen indices for the fabrics vs. the solids bars, as specified in the ASTM test method is expected due to the higher surface-to-volume relationship in the fabric specimens.)

It will be apparent that various modifications may be made to the invention within the scope of the teaching herein presented without departing from the essence of the invention. Accordingly, the invention is not to be limited by the specific embodiments or illustrations, except to the extent defined in the appended claims.

1. A fire retardant thermoplastic polymer composition comprising polyethylene terephthalate having incorporated therein a bromoaryl compound selected from the group consisting of hexabromobenzene, pentabromotoluene and octabromodiphenyl in an amount sufficient to provide from about 1% to about 10% by weight of bromine based on the weight of the polymer, in combination with triphenylphosphate in an amount sufficient to provide from about 0.1% to about 2% by weight phosphorus based on the weight of the polymer.

2. A fire retardant composition in accordance with claim 1 wherein said bromoaryl compound is hexabromobenzene.

3. A fire retardant composition in accordance with claim 1 wherein said bromoaryl compound is pentabromotoluene.

4. A fire retardant composition in accordance with claim 1 wherein said bromoaryl compound is octabromodiphenyl.

5. A fire-retardant polymer composition of claim 1 wherein bromine is present in the range of from about 2.0 to about 5.0 weight % and the phosphorus content is in the range of from about 0.2 to about 1.0 weight %.

6. A fire-retardant fiber of the composition of claim 1.

7. A fire-retardant fabric prepared from the fiber of claim 1.

8. A fire-retardant carpet prepared from the fiber of claim 1.

* * * * *